United States Patent

Henle

[15] 3,671,772

[45] June 20, 1972

[54] DIFFERENCE AMPLIFIER

[72] Inventor: Robert A. Henle, Hyde Park, N.Y.

[73] Assignee: International Business Machines Corporation, Armonk, N.Y.

[22] Filed: Oct. 1, 1969

[21] Appl. No.: 862,703

[52] U.S. Cl. ..............................307/291, 307/238, 307/279, 307/292, 340/173

[51] Int. Cl. ..............................H03k 3/26

[58] Field of Search..................307/291, 292, 247, 208, 279, 307/238; 340/173

[56] References Cited

UNITED STATES PATENTS

| | | | |
|---|---|---|---|
| 2,866,105 | 12/1958 | Eckert | 307/208 |
| 3,560,764 | 2/1971 | McDowell | 307/238 |
| 3,564,300 | 2/1971 | Henle | 307/291 |
| 2,920,215 | 1/1960 | Lo | 307/215 |
| 3,226,574 | 12/1965 | Winkler | 307/221 |
| 3,309,534 | 3/1967 | Yu | 307/292 |
| 3,423,737 | 1/1969 | Harper | 307/299 |

*Primary Examiner*—Donald D. Forrer
*Assistant Examiner*—David M. Carter
*Attorney*—Hanifin and Jancin and Julius B. Kraft

[57] ABSTRACT

A difference amplifier used as a sense amplifier for stored binary data being read from a computer memory. The amplifier includes a pair of cross-coupled transistors, a power source providing an operating voltage for said transistors, and means for intermittently applying said power source to the cross-coupled transistors. Selective application means apply each of the pair of voltage signals to be differentiated from each other to a respective one of the pair of cross-couplings, i.e., the pair of cross-connected regions in the transistors. In the case of reading from binary storage, the voltage signals are applied from the pair of sense lines from the memory storage. The signals are applied during a period when the voltage source is not being applied and, consequently, both of the paired transistors are in the non-conductive state. The signals establish a stored charge in each of the transistors; the difference between these charges will determine which of the transistors assumes the conductive state when the power is subsequently applied.

8 Claims, 4 Drawing Figures

INVENTOR
ROBERT A. HENLE

BY J. B. Kraft
ATTORNEY

DIFFERENCE AMPLIFIER

BACKGROUND OF THE INVENTION

1. Field of the Invention

The present invention relates to difference amplifier circuits and more particularly to improved sense amplifier circuits for detecting and amplifying the output of computer memory, both core and monolithic, as well as thin film memory. The sense amplifier circuits are also utilizable in general with lines where common modes signal rejection is an important requirement, e.g., line receivers in computers.

2. Description of the Prior Art

The principle function of a sense amplifier in magnetic core memories, monolithic memories, or thin film memory systems is to distinguish between a binary "0" signal and a binary "1" signal output from a selected memory bit and to amplify the detected signal to a level sufficient to drive logic circuits or other circuits in the computer. The sense amplifier should be capable of distinguishing between an acceptable low level "1" or "0" and a noise level on the complementary "1" or "0" signal which is to be rejected. Sense amplifiers must be capable of common mode rejection of signals of the same polarity where the signals have been randomly or inadvertently introduced into the system.

With the ever-increasing microminiaturization of integrated circuit devices associated with computer memories, the problem of power dissipation resulting in undesirable heating of the devices becomes more pronounced. As the density of devices per unit area of integrated circuit substrate is increased, the need becomes greater for expedients which will minimize heating effects and thereby permit the memory itself and the support circuitry to be maintained at operating temperatures. Where the memory itself or the storage area proper is a monolithic memory cell array, the heating effect is a significant problem because of the extensive power dissipation within the monolithic array. However, even where the memory proper is magnetic core storage, increased density in the integrated support circuitry used for addressing, reading and writing, etc., still gives rise to a heating problem.

In addition, in order to meet the needs for miniaturized support circuitry, the art is seeking simplified support circuitry utilizing fewer devices for higher reliability and greater functional density. In this connection, consider the existing sense amplifiers. The sense amplifier circuits must be capable of detecting stored voltages in the order of 0.001V in thin film memory, 0.05V in magnetic core memory, and about 0.1V in monolithic memory and amplifying such detected signals to a level in the order of 1V necessary to drive the logic circuitry in the computer. Existing sense amplifiers, of which the structure described in U.S. Pat. No. 3,309,538 is typical, require three or more stages having a total of six or more transistors, as well as attendant impedance elements in order to detect and amplify a stored signal to a utilizable level.

SUMMARY OF THE INVENTION

Accordingly, it is a primary object of the present invention to provide a simplified difference amplifier utilizable as a sense amplifier.

It is another object of the present invention to provide a simplified monolithic integrated circuit sense amplifier.

It is a further object of the present invention to provide an integrated sense amplifier circuit in which power dissipation has been reduced to a minimum.

It is even another object of the present invention to provide an integrated sense amplifier circuit having a relatively large gain and a minimum of devices.

It is even a further object of the present invention to provide a sense amplifier capable of distinguishing signals differing in the order of 0.001V.

The present invention provides a difference amplifier comprising bistable circuit means including a pair of cross-coupled transistors. By "cross-coupled transistors" is meant either a pair of bipolar transistors with the base of each cross-coupled to the collector of the other, or a pair of field effect transistors with the gate of each transistor coupled to a terminal, e.g., drain of the other. The amplifier further includes a power source which, when applied to the bistable circuit means, provides an operating voltage therefor and means for intermittently applying the power source to the bistable circuit means. The amplifier also includes means for applying each of the pair of voltage signals to be differentiated from each other to a respective one of the cross-couplings prior to the application of the power source; for example, in the cross-coupled bipolar transistors, one of the voltage signals is applied to the first of the cross-couplings between base and collector, while the other voltage signal is applied to the other cross-coupling between base and collector. Since the power source is not being applied when the pair of voltage signals are initially applied, neither of the paired transistors is conductive or "On." Accordingly, the applied signals establish a stored charge in each of the transistors. When the power source is subsequently applied, the difference between the charges stored in each of the transistors will determine which transistor assumes the conductive or "On" state and which transistor remains non-conductive or "Off."

The sense difference amplifier of the present invention is capable of a gain which provides in a single stage an amplification sufficient to bring a stored bit or signal to the level which will drive computer logic circuitry. The enhanced amplification capability of the sense amplifier of the present invention results from a new mode of operation. Conventional difference or sense amplifiers merely amplify the difference between two signals. Because these stored signals are relatively small, in the order of from 0.001 to 0.1 volts, several amplification stages are conventionally required to bring the signal difference to a discernible level capable of driving computer logic circuitry. In the sense amplifier of the present invention, the difference between the two signals is not immediately amplified. Rather, this difference is used only to deposit a charge differential on the inputs to the amplifier, common mode noise potentials are rejected and the charge differential causes the bistable circuit to assume a state which provides an output indicative of said state at a level sufficient to drive computer logic circuitry. By reducing the required amplification stages and, consequently, the number of transistors and other devices, the present sense amplifier provides a desirable reduction in space requirements for memory support circuitry.

In addition, a reduced number of devices means an attendant reduction in overall heat generation in the support circuitry. Also, the power to the sense amplifier is not continuously applied during memory cycle, e.g., sensing or reading operations as in prior art circuits. Due to the charge storage of input signals in the "Off" transistor pair, the power for the amplifier need only be applied a fraction of the time, under optimum conditions only in the order of 10 percent of the time. This reduction in power dissipation results in a reduction in undesirable heating from integrated circuit supporting structures in computer memories.

The foregoing and other objects, features and advantages of the invention will be apparent from the following more particular description and preferred embodiments of the invention as illustrated in the accompanying drawings.

DESCRIPTION OF THE PREFERRED EMBODIMENTS

Figure 1:
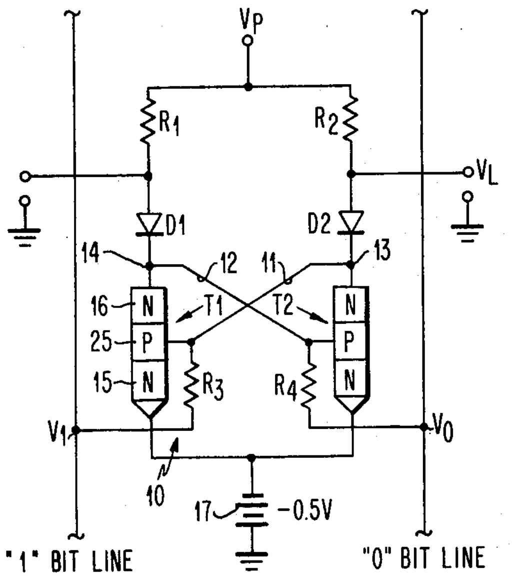
FIG. 1 is a schematic circuit diagram of a preferred embodiment of the difference amplifier of the present invention.
Figure 3:
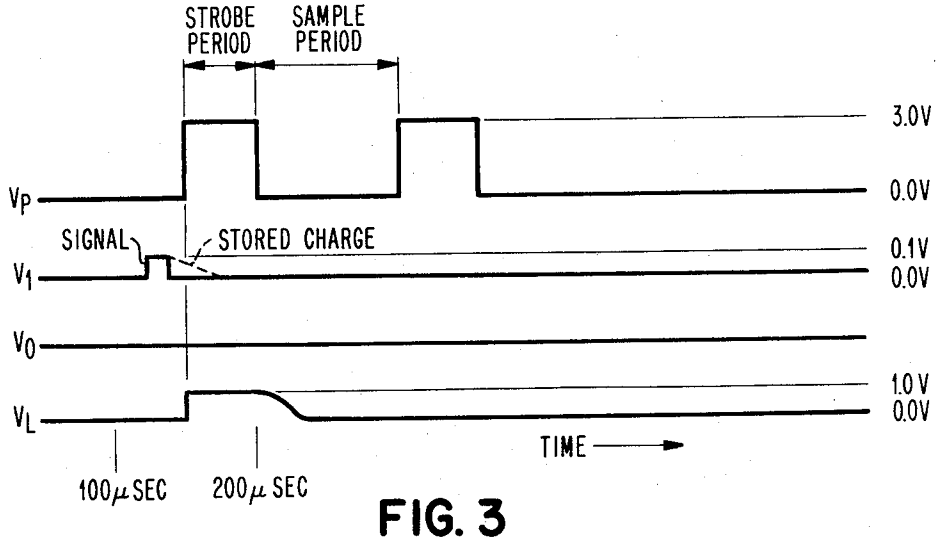
FIGS. 3 is a timing chart showing the voltage wave forms of the inputs, the power of the applied power source and the output of the difference amplifiers of FIGS. 1 and 2.

With reference to FIG. 1, an intermittent or pulse power supply $V_P$, having the waveform shown in FIG. 3, provides intermittent operating voltage to bistable circuit 10 which comprises the pair of directly cross-coupled transistors T1 and T2. Cross-coupling 11 connects the base of transistor T1 to the collector of transistor T2 and cross-coupling 12 connects the base of transistor T2 to the collector of transistor T1. Signals from the "0" bit sense line and the "1" bit sense line are respectively applied as inputs $V_0$ and $V_1$, $V_0$ being applied to cross-coupling 12 through resistance $R_4$, while $V_1$ is applied to cross-coupling 11 through resistance $R_3$. The output of the sense amplifier, which has the waveform shown in FIG. 3, is taken at terminal $V_L$. Voltage source $V_P$ is applied to cross-couplings 11 and 12 and, consequently, to transistors T1 and T2 via matched diodes D1 and D2 and matched resistances $R_1$ and $R_2$.

The operation of the sense amplifier will now be described with reference to FIGS. 1 and 3. The operation consists of sequential time periods. Each of these time periods is divided into sample and strobe periods. During the sample period, voltage supply $V_P$ is at zero volts or ground level, and both transistors T1 and T2 are non-conductive or "Off." Also, diodes D1 and D2 are essentially in their non-conductive or "Off" state. It is during this sample period that the voltage signals from the "0" and "1" bit lines being sensed are respectively applied to cross-couplings 11 and 12. Let us assume that information indicative of storage of a "1" bit is applied to the bit sense lines during this period. Consequently, a pulse having a magnitude in the order of about 0.1V, as shown in FIG. 3, is applied to input terminal $V_1$ which is connected via resistor $R_3$ to cross-coupling 11. There is no pulse on the "0" bit line so, consequently, the voltage level applied to input terminal $V_0$ remains zero volts. Since the discharge path to ground of the positive voltage applied via terminal $V_1$ to coupling 11 is blocked by diode D2 during the sample period, the voltage applied to coupling 11 is stored as a charge on the capacitances of both the base 25/collector 16 and base 25/emitter 15 junctions.

Figure 4:
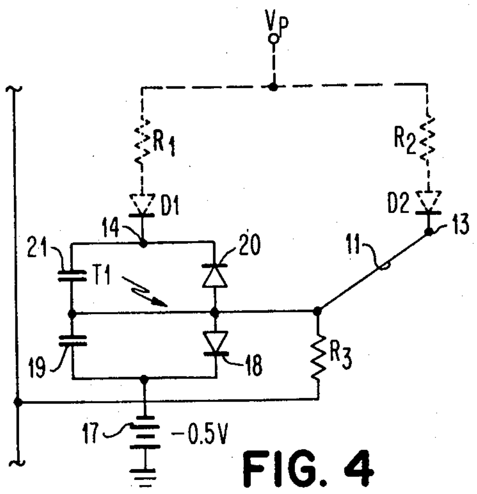
FIG. 4 is a schematic diagram of the effective storage circuitry within each of the cross-coupled transistors T1 and T2 of FIG. 1 during a period when no power is being applied by voltage source $V_P$.

This storage phenomenon will be better understood with reference to FIG. 4 which schematically represents the condition of transistor T1 when the 0.1 volt pulse representative of a "1" bit is applied to terminal $V_1$. It should be understood that a similar analysis could be made with respect to transistor T2. The DC bias 17 for the bistable circuit is such that the base-emitter junctions of transistrs T1 and T2 are forward biased, but during the "Off" or sample period when no power is being applied, these junctions are operating in a very high impedance region in the order of 100 Kohms. Likewise, the conventionally back biased base-collector junctions of the transistor pair also have an impedance in the order of 100 Kohms or greater. Blocking diodes D1 and D2 effectively remove any potential path through load resistances $R_1$ or $R_2$ from the circuit during the sample period; this removed portion of the circuit is represented in dotted lines in FIG. 4. Accordingly, the base-emitter junction in transistor T1 may be represented by an equivalent circuit consisting of diode 18 having an impedance of about 100 Kohms shunted by capacitance 19, while the base-collector junction may be represented by an equivalent circuit consisting of diode 20 having an impedance of about 100 Kohms shunted by capacitance 21. The voltage applied to coupling 11 through input $V_1$ will be stored on capacitances 19 and 21.

In a similar manner, any input to coupling 12 via input $V_0$ will be stored on the capacitances of the junctions in transistor T2. By virtue of such storage, the voltage level at the bases of T1 and T2 and, consequently, at couplings 11 and 12, during the sample perid will represent the voltage level applied at inputs $V_1$ and $V_0$. FIG. 3 illustrates the applied voltage to $V_1$ with the resulting stored voltage being shown as a dotted line. It should be noted that the only significant discharge path of the positive signal being applied to the base of transistor T1 is through equivalent circuit diode 18 having a very high impedance in the order of 100 Kohms. The applied voltage is consequently stored primarily on the previously described junction capacitances.

Subsequently, when voltage source $V_P$ is applied during the strobe period, the stored voltage at the base of transistor T1 and, consequently, at node 13 of coupling 11, will be just under 0.1V, while the voltage at the base of transistor T2 and, consequently at node 14 of coupling 12, will be about 0 volts. Under these conditions, the bistable circuit will assume a state wherein transistor T1 is conductive or "On," while transistor T2 is non-conductive. This will produce an amplified voltage at load output $V_L$ having a magnitude in the order of 1.0 volts, which is sufficient to drive computer logic circuit without any further amplification.

While during the application of the voltage signal $V_1$ the only significant discharge path from the base of T1 is through equivalent circuit high impedance diode 18, once signal $V_1$ is terminated, an alternative path to ground is available via resistor $R_3$ to the bit sense line. The rate of discharge of the stored charge in the base of T1 will be determined by the impedance of $R_3$, the higher the impedance the longer the storage period. Accordingly, it would appear that higher impedances for $R_3$ would be desirable in that they would permit a wider latitude between the application of a voltage signal on input $V_1$ and the application of power source $V_P$ during the strobe period. However, it must be recognized that subsequent to the termination of power source $V_P$ following the strobe period, there will be a residual charge resulting from the conductive state in the base of the transistor which was "On" or conductive during the strobe period. For example, if transistor T1 was "On," a residual charge will be present in the base after termination of $V_P$. This residual charge should be dissipated during the subsequent sample period before the next application of signals to inputs $V_1$ and $V_0$. Otherwise, this residual charge may obscure the operation of the sense amplifier in distinguishing between the subsequently applied signals. Thus, if the impedance of $R_3$ is very high, the period for the dissipation of residual charge from the conductive cycle will be correspondingly large, and the application of the input signals will have to be delayed until the residual charge reaches a level which will not affect the difference between the input signals. For the timing cycle shown in FIG. 3, an impedance in the order of 1 Kohm for resistors $R_3$ and $R_4$ has been found to be an effective level. However, it should be understood that these resistance values may be tailored to the needs of the amplifier circuit in accordance with the considerations set forth above.

The strobe and sample periods need not be of any fixed duration or regular periodicity. Conventional computer timing cycles may be arranged so that the strobe period is initiated prior to the time of initiation of the sense signals on inputs $V_1$ and $V_0$. The signal inputs may be applied at any point during the sample period such that the stored information resulting from the applied signals is still at a discernible difference level when power is applied during the strobe period. It is not necessary for the applied signal voltage to be terminated prior to the application of the power source. However, it is essential that the application of the signal voltages be initiated prior to the application of the power source.

In order to achieve sensitivities to voltage signal differences in the order of levels as low as 0.001V, it is most preferably that transistors T1 and T2 be simultaneously fabricated transistors within a monolithic integrated circuit. Transistors fabricated in this manner within a single integrated circuit come as close as possible to being matched transistors.

Figure 2:
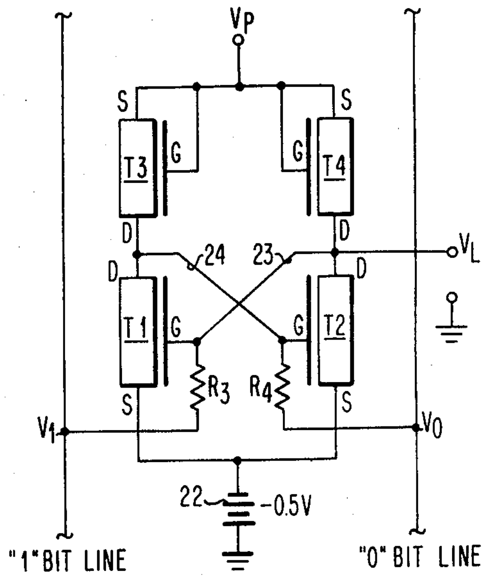
FIG. 2 is a schematic circuit diagram of another embodiment of the present invention utilizing field effect devices instead of bipolar devices.

In FIG. 2, there is shown another embodiment of the basic sense amplifier of this invention which utilizes field effect transistors instead of the bipolar transistors and diodes used in the circuit in FIG. 1. The transistors are N channel, enchancement mode, metal oxide semiconductor (MOS) transistors which are also called insulated gate field effect transistors (IGFET). The transistors have three terminals known as the gate, drain, and source. Transistors T1 and T2 in FIG. 2 from a cross-coupled bistable circuit which is the counterpart of the bistable circuit formed by the equivalent transistors in FIG. 1. Similarly, transistors T3 and T4 respectively perform the same functions as diodes D1 and D2 of the circuit of FIG. 1 so as to provide a high impedance path when voltage source $V_P$ is not being applied. Likewise, resistors $R_3$ and $R_4$ of the circuit of FIG. 2 perform the equivalent function of the same resistors in FIG. 1. Also, DC bias 22 performs the same function as DC bias 17. The overall circuit functions in the same manner with the signal inputs $V_1$ and $V_0$, which are applied during the sample period, being stored respectively in transistors T1 and T2, resulting in different voltage levels at cross-couplings 23 and 24 which, in turn, are determinative of the transistor assuming the conductive state when the voltage source $V_P$ is applied during the strobe period. The timing cycle of the circuit of FIG. 1, as shown in FIG. 3, also applies to the circuit of FIG. 2.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A monolithic integrated semiconductor difference amplifier circuit comprising bistable circuit means comprising a pair of cross-coupled transistors, a power source for said bistable circuit means providing an operating voltage for said circuit means, means for intermittently applying said power source to said bistable circuit means, said cross-coupled transistors being non-conductive when said power source is not being applied, means for applying each of a pair of voltage signals to be differentiated from each other to a respective one of the cross-couplings prior to an application of the power source whereby said signals establish a stored charge in each of said transistors, the difference between said charges determining which one of said transistors assumes the conductive state upon the application of the power source, said pair of voltage signals differing from each other by 0.1V or less, and load impedance means for each transistor through which said power source is applied, said impedance means including semiconductor switch means, responsive to an interruption in the application of the power source, to provide a high impedance discharge path for the stored charge in the transistors when the power source is not being applied and said load impedance having a greater resistance than the cross-coupling resistance between transistors at all times.

2. The difference amplifier of claim 1 wherein said cross-coupled transistors have a common emitter.

3. The difference amplifier of claim 1 wherein said semiconductor switch comprises unilateral conduction means.

4. The difference amplifier of claim 1 wherein said semiconductor switch comprises a diode.

5. The difference amplifier of claim 1 wherein said pair of transistors are bipolar transistors having cross-coupled collectors and bases.

6. The difference amplifier of claim 1 wherein said pair of transistors are field effect transistors having cross-coupled drains and gates.

7. The difference amplifier of claim 1 wherein said power source is applied before the stored charges become ineffective for determining which of the transistors assumes the conductive state.

8. The difference amplifier of claim 1 wherein both transistors are non-conductive when the power source is not being applied.

* * * * *